United States Patent
Bryan et al.

(10) Patent No.: US 7,140,812 B2
(45) Date of Patent: Nov. 28, 2006

(54) DIAMOND TOOL WITH A MULTI-TIPPED DIAMOND

(75) Inventors: William J. Bryan, Mahtomedi, MN (US); Nelson D. Sewall, Forest Lake, MN (US); Jeffrey E. Clements, New Richmond, WI (US)

(73) Assignee: 3M Innovative Properties Company, St. Paul, MN (US)

( * ) Notice: Subject to any disclaimer, the term of this patent is extended or adjusted under 35 U.S.C. 154(b) by 11 days.

(21) Appl. No.: 10/159,925

(22) Filed: May 29, 2002

(65) Prior Publication Data

US 2003/0223830 A1 Dec. 4, 2003

(51) Int. Cl.
*B23B 27/20* (2006.01)

(52) U.S. Cl. ............... 407/119; 407/113; 29/557
(58) Field of Classification Search ............ 407/119, 407/113, 65, 117; 29/557, 527.3; 359/530; 409/131; 51/294; 33/18.1
See application file for complete search history.

(56) References Cited

U.S. PATENT DOCUMENTS

| | | | |
|---|---|---|---|
| 1,348,115 A | 7/1920 | Hutchinson | |
| 2,738,730 A | 3/1956 | Boyajean | |
| 3,680,213 A * | 8/1972 | Reichert | 33/18.1 |
| 3,780,409 A | 12/1973 | Bartoszevicz | |
| 3,813,970 A | 6/1974 | Mitchell | |
| 3,893,356 A | 7/1975 | Atzberger | |
| 4,035,590 A | 7/1977 | Halter | |
| 4,044,379 A | 8/1977 | Halter | |
| 4,111,083 A | 9/1978 | Carter | |
| 4,113,266 A | 9/1978 | Alexandrovich | |
| 4,113,267 A | 9/1978 | Wittenberg | |
| 4,287,689 A | 9/1981 | Mindel et al. | |
| 4,355,382 A | 10/1982 | Dholakia et al. | |
| 4,504,940 A | 3/1985 | Nishiguchi et al. | |
| 4,525,751 A | 6/1985 | Freeman et al. | |
| 5,216,843 A | 6/1993 | Breivogel et al. | |
| 5,555,473 A | 9/1996 | Seitz et al. | |
| 5,663,802 A | 9/1997 | Beckett et al. | |
| 5,814,355 A | 9/1998 | Shusta | |
| 5,958,799 A | 9/1999 | Russell et al. | |
| 6,029,349 A | 2/2000 | Berkhout et al. | |
| 6,110,030 A * | 8/2000 | Hashimoto | 451/540 |
| 6,140,655 A | 10/2000 | Russell et al. | |
| 6,253,442 B1 * | 7/2001 | Benson et al. | 29/557 |
| 6,337,281 B1 * | 1/2002 | James et al. | 51/294 |
| 6,379,592 B1 | 4/2002 | Lundin | |

FOREIGN PATENT DOCUMENTS

| | | |
|---|---|---|
| CH | 359899 | 3/1962 |
| DE | 885 163 | 7/1949 |
| EP | 0 830 946 | 3/1998 |
| EP | 1 092 515 | 4/2001 |
| FR | 967.169 | 10/1950 |
| WO | WO 89/04052 | 5/1989 |
| WO | WO 96/32741 | 10/1996 |

OTHER PUBLICATIONS

"Ultra fine finishing of diamond tools by ion beams," Precision Engineering, vol. 9, No. 2, pp. 71–78, Apr. 1987.

(Continued)

*Primary Examiner*—Willmon Fridie, Jr.
(74) *Attorney, Agent, or Firm*—Stephen W. Buckingham

(57) ABSTRACT

In one embodiment, a tool used for creating grooves in a microreplication tool is described. The tool includes a mounting structure and a multi-tipped diamond mounted in the mounting structure. The different tips of the diamond may correspond to different grooves to be created in the microreplication tool. In this manner, the creation of a microreplication tool using a diamond can be simplified and/or improved.

16 Claims, 11 Drawing Sheets

OTHER PUBLICATIONS

Information Disclosure Statement—Declaration by Applicant William J. Bryan.

Dave P. Adams et. al., "Focused Ion Beam Shaped Micro–Cutting Tools for Fabricating Curvlinear Features"; Proceedings of the Fifteenth Annual Meeting of the American Society For Precision Engineering; 2000, vol. 22, p. 176–179; Publisher: American Society for Precision Engineering, Raleigh, NC, USA.

Dave P. Adams et. al., "Microgrooving and Microthreading Tools for Fabricating Curvlinear Features"; Precision Engineering, Oct. 2000, vol. 24, issue 4, pp347–356; Publisher: Elsevier, USA.

Michael J. Vasile, et. al., "Microfabrication Techniques Using Focused Ion Beams and Emergent Applications"; Micron, Jun. 1999, vol. 30, issue 3, pp235–244; Publisher: Pergamon/Elsevier, USA.

Michael J. Vasile, et. al, "Focused Ion Beam Technology Applied To Microstructure Fabrication"; J. Vac. Sci. Technol. B. vol. 16, No. 4, Jul./Aug. 1998, pp2499–2505; Publisher: Amer. Inst. Physics, USA.

Michael J. Vasile, et. al., "Microfabrication by Ion Milling: The Lathe Technique"; J. Vac. Sci. Technol. B. vol. 12 No. 4, Jul./Aug. 1994, pp2388–2393; Publisher: Amer. Inst. Physics, USA.

Yoosuf N. Picard, et. al, "Focused Ion Beam–Shaped Microtools for Ultra–Precision Machining of Cylindrical Components"; Precision Engineering, Jan. 2003, vol. 27, issue 1, pp59–69; Publisher: Elsevier, USA.

* cited by examiner

DIAMOND TOOL WITH A MULTI-TIPPED DIAMOND

FIELD

The invention relates to diamond machining and the creation of diamond tools used in diamond machining.

BACKGROUND

Diamond machining techniques can be used to create a wide variety of work pieces such as microreplication tools. Microreplication tools are commonly used for extrusion processes or injection molding processes to create microreplicated structures. The microreplicated structures may comprise optical films, mechanical fasteners having self-mating profiles, or any molded or extruded parts having microreplicated features of relatively small dimensions, such as dimensions less than 1000 microns.

Microreplication tools include casting belts, casting rollers, injection molds, extrusion or embossing tools, and the like. Microreplication tools are often created by a diamond machining process in which a diamond tool is used to cut grooves or other features into the microreplication tool. The process of creating a microreplication tool using a diamond tool can be costly and time consuming.

A number of techniques for creating the diamond tool used to create the microreplication tool have also been developed. For example, grinding or lapping processes are often used to create precision shaped diamond tools. However, the range of profiles and shapes that can be formed by grinding and lapping processes is limited.

SUMMARY

In general, the invention is directed to diamond tools that include a multi-tipped diamond for use in creating microreplication tools or other work pieces. The multiple tips of the diamond tool can be used to simultaneously create multiple grooves or other features, in a microreplication tool. The diamond tool may include a mounting structure such as a tool shank, and a multi-tipped diamond mounted in the mounting structure. The different tips of the diamond may correspond to different grooves to be created in the microreplication tool.

By creating multiple tips on the same diamond, the creation of the microreplication tool may be improved or simplified. In particular, since the diamond has multiple tips, fewer cutting passes of the diamond may be needed to cut the grooves in the microreplication tool, which can reduce tooling costs. For example, if the diamond includes two tips, the number of passes required to cut the grooves in the microreplication tool can be reduced by one-half. In addition, if the same diamond defines multiple grooves to be cut in the microreplication tool, variations between individually cut grooves in the microreplication tool can be reduced relative to microreplication tools having grooves cut by multiple passes of a single tipped diamond. In this manner, the quality of the microreplication tool can be improved. Improving the quality, and reducing the time and costs associated with the creation of the microreplication tool, in turn, may effectively reduce the costs associated with the ultimate creation of microreplicated structures.

Additional details of these and other embodiments are set forth in the accompanying drawings and the description below. Other features, objects and advantages will become apparent from the description and drawings, and from the claims.

DETAILED DESCRIPTION

The invention is directed to diamond tools that include a multi-tipped diamond for use in creating microreplication tools or other work pieces. In particular, the diamond tool can be used to simultaneously cut a plurality of grooves during the creation of a microreplication tool. Thus, the cutting time associated with the creation of a microreplication tool can be reduced. In this manner, the production cycle associated with the ultimate creation of microreplication structures can be simplified.

The diamond tool may include a mounting structure such as a tool shank, and a multi-tipped diamond mounted in the mounting structure, wherein the different tips of the diamond correspond to different grooves to be created in the microreplication tool. The tips can be formed using focused ion beam milling processes. The number of tips formed in the multi-tipped diamond may vary for different embodiments. For example, in some cases, two tips are formed on a diamond, and in other cases, a larger number of tips are formed on the diamond. Various shapes and sizes of the tips are also described, which may be useful in the creation of various different microreplication tools. Focused ion beam milling processes can be used to create or perfect the desired shapes of the diamond tips.

In addition, processes for simplifying the creation of multi-tipped diamonds are also described. As mentioned, focused ion beam milling processes may be used to form the multiple tips. However, because of high costs generally associated with focused ion beam milling, it may be desirable to initially process the diamond using less costly techniques such as grinding, lapping, or wire sawing techniques. Then, the focused ion beam milling process can be used to perfect the shapes of the tips, and to perfect the shape of valleys formed between adjacent tips. By reducing the amount of focused ion beam milling needed to create the desired shape of the tips, costs can be reduced.

In general, the creation of multiple tips on the same diamond can improve and simplify the creation of microreplication tools by reducing the number of cutting passes of the diamond needed to create the grooves on the microreplication tool. Furthermore, by using the same diamond to define multiple grooves to be cut in the microreplication tool, variations between individually cut grooves in the microreplication tool can be reduced, which can improve the quality of the microreplication tool. All of these factors can effectively reduce the costs associated with the ultimate creation of microreplicated structures.

Figure 1:
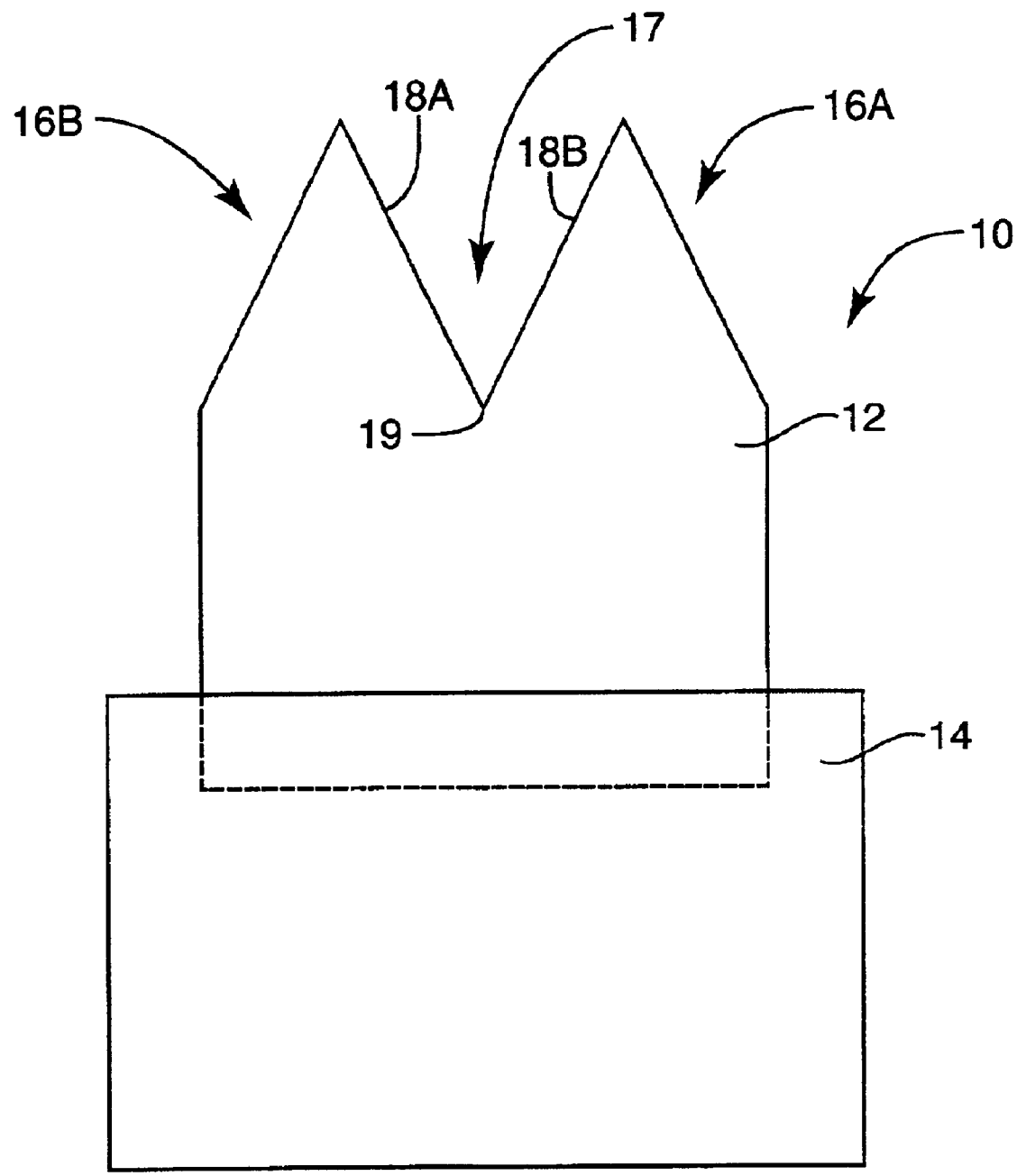
FIG. 1 is a top view of a two-tipped ion beam milled diamond mounted in a mounting structure.

FIG. 1 is a top view of a tool 10 that includes a two-tipped ion beam milled diamond 12 mounted in a mounting structure 14. Mounting structure 14 may comprise a tool shank or other metallic structure or composite for holding diamond 12. Diamond 12 can be secured within mounting structure 14 via brazing, soldering, an adhesive, or any other securing mechanism such as one or more bolts or screws. Mounting structure 14 may have a shape that allows tool 10 to be inserted into an apparatus of a diamond tooling machine that is used to cut grooves or other features into a microreplication tool. By way of example, the diamond tooling machine may be a diamond turning machine configured for plunge cutting in which the diamond passes into a moving work piece to cut grooves in the work piece. Alternatively the diamond tooling machine may be a diamond turning machine configured for fly-cutting in which the diamond is rotated about an axis in proximity to a work piece to cut grooves or other features in the work piece.

Diamond 12 defines multiple tips 16. Each tip 16 defines a separate cutting mechanism that corresponds to the creation of a distinct feature of a work piece such as a groove in a microreplication tool being created. In the embodiment illustrated in FIG. 1, diamond 12 includes two tips 16A and 16B, although any number of tips may be formed for various embodiments. Tips 16A and 16B are adjacent to one another, and form a valley 17 between the tips. Focused ion beam milling processes can be used to form tips 16A and 16B, and may also be used to form valley 17 such that valley 17 defines characteristics needed for effective diamond machining. For example, focused ion beam milling can be used to ensure that inner surfaces 18A and 18B of tips 16A and 16B meet along a common axis 19 to form a bottom of valley 17. Also, focused ion beam milling can be used to form features in the valley 17, such as a concave or convex arc ellipses, parabolas, mathematically defined surface patterns, or random or pseudo-random patterns.

Precise creation of valley 17 can be very important because valley 17 can define a protrusion to be created in a microreplication tool. For example, valley 17 may define a concave or convex arc having a radius defined relative to an external reference point, or may define an angle between the adjacent surfaces 18A and 18B. A wide variety of other shapes of valley 17 could also be formed. In any case, the grooves and protrusions created in the microreplication tool may need to meet precise specifications so that the microreplication tool is effective in creating microreplicated structures. Additionally, because the multiple tips 17 are formed on a single diamond, alignment issues associated with the use of separate diamonds in a single tool can be avoided.

Figure 2A:
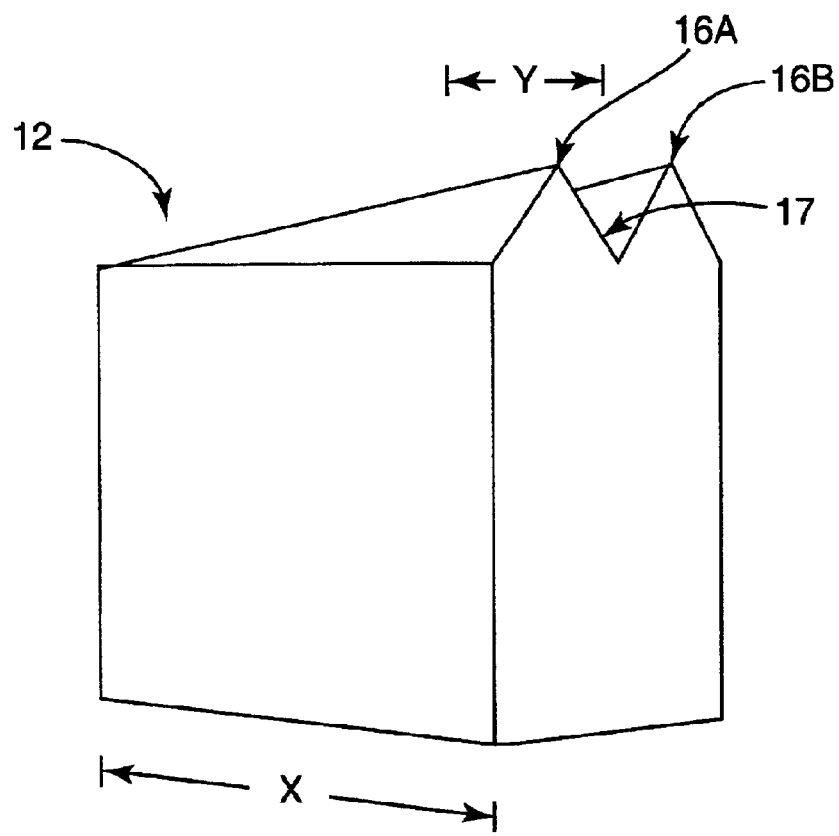
FIGS. 2A and 2B are perspective views of a two-tipped ion beam milled diamond according to one embodiment of the invention.
Figure 2B:
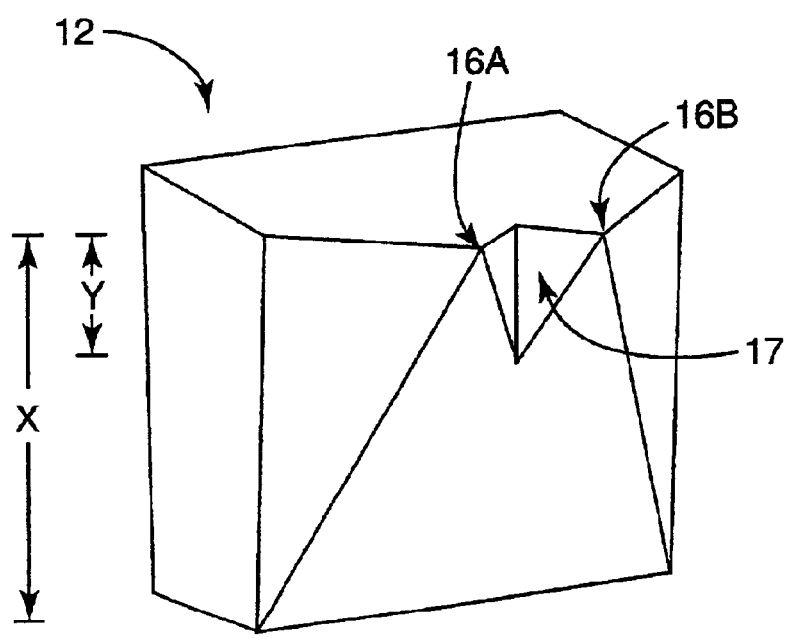

FIGS. 2A and 2B are perspective views of a two-tipped ion beam milled diamond 12 according to one embodiment of the invention. As shown, diamond 12 may define a thickness X. A bottom of valley 17 may extend a substantial distance Y along the thickness X. Y may be less than or equal to X. As illustrated, a top surface of diamond 12 may be tapered along the distance Y, or alternatively may define a constant heights. By way of example, the thickness X may be approximately between 0.5 millimeters and 2 millimeters and the distance Y may be approximately between 0.001 millimeters and 0.5 millimeters, although the invention is not necessarily limited in those respects.

Figure 3:
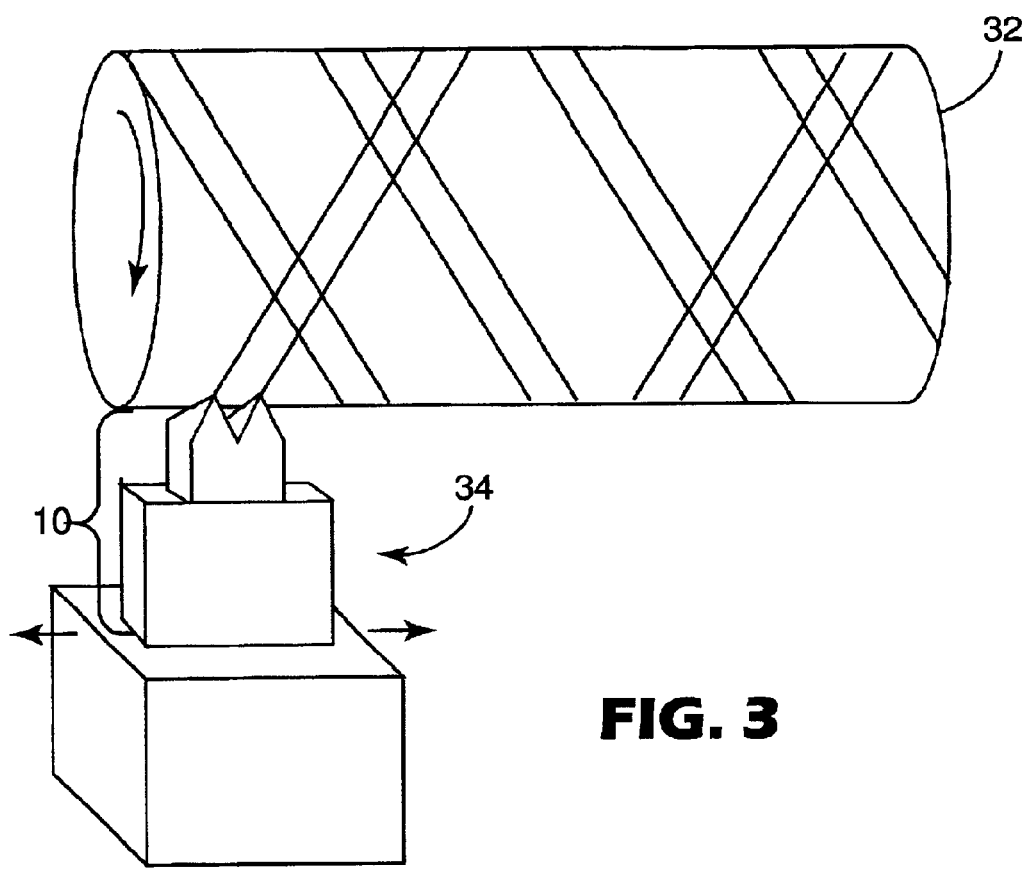
FIG. 3 is a conceptual perspective view of a two-tipped diamond tool simultaneously cutting two grooves during the creation of a microreplication tool.

FIG. 3 is a conceptual perspective view of a two-tipped diamond tool 10 used to simultaneously cut two grooves during the creation of a microreplication tool 32. In the example of FIG. 3, microreplication tool 32 comprises a casting roll, although other microreplication tools such as casting belts, injection molds, extrusion or embossing tools, or other work pieces could also be created using diamond tool 10. Diamond tool 10 may be secured in a diamond tooling machine 34 that positions the diamond tool 10 relative to microreplication tool 32, and moves the diamond tool 10, e.g., in lateral directions (as illustrated by the arrows) relative to the microreplication tool 32. At the same time, microreplication tool 32 may be rotated about an axis. Diamond tooling machine 34 may be configured to pass the diamond tool 10 into a rotating microreplication tool 32 via plunge or thread cutting techniques to cut grooves in the microreplication tool 32. Alternatively, diamond tooling machine 34 may be configured for fly-cutting in which the diamond tool 10 is rotated about an axis in proximity to the microreplication tool 32 to cut grooves or other features in the microreplication tool 32. Diamond tooling machine 34 may also be configured for scribing or ruling, in which diamond tool 10 is displaced through a work piece very slowly. In any case, grooves can be cut, and protrusions can be formed on the work piece. The formed grooves and protrusions may define the ultimate form of microreplicated structures created using the microreplication tool 32, for example, during an extrusion process. Alternatively, the formed grooves and protrusions may form features by displacement of material in work piece other than a microreplication tool.

Because diamond tool 10 implements a diamond having multiple tips, fewer passes of the diamond tool are needed to cut the grooves on the microreplication tool. This can reduce production costs and speed the production cycle associated with creation of microreplication tools. Creation of a work piece can take hours if not days in some cases. Incorporation of two or more tips within diamond tool 10 for simultaneous use can reduce the production cycle to a fraction of that time. For example, if the diamond includes two tips 16 (as illustrated in FIG. 3), the number of passes required to cut grooves in the microreplication tool 32 can be reduced by one-half relative to a diamond tool that includes a single-tipped diamond. Additional tips 16 may add further benefits in a similar manner. Also, because the same diamond defines multiple grooves to be cut in the microreplication tool 32, variations between individually cut grooves in the microreplication tool 32 can be reduced, which can improve the quality of the microreplication tool 32. Improving the quality, and reducing costs associated with the creation of the microreplication tool 32, in turn, may effectively reduce the costs associated with the ultimate creation of microreplicated structures.

In contrast, when a single tipped diamond is used to create grooves on a microreplication tool, depth variations between adjacent grooves may be formed. The difference in depth is sometimes referred to as "clean-up," because additional modifications to the microreplication tool may be needed to adjust the depths of grooves and heights of protrusions created on the microreplication tool. This clean-up can be reduced or avoided when a multi-tipped diamond is used. In that case, the depth of adjacent grooves created in the microreplication tool may be defined by adjacent tips of the multi-tipped diamond. Thus, if the height of the adjacent tips are defined to be substantially the same, the depth of adjacent grooves created in the microreplication tool may also be the same. Avoiding or reducing clean-up can also decrease time and cost associated with the creation of microreplicated structures.

Figure 4:
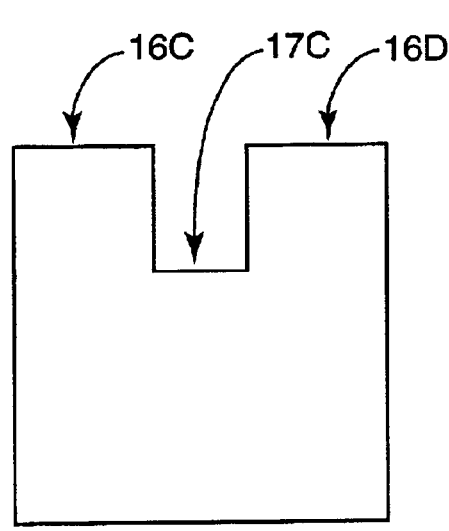
FIGS. 4–7 are top views of two-tipped ion beam milled diamonds according to various embodiments of the invention.

FIGS. 4–7 are top views of two-tipped ion beam milled diamonds according to various embodiments of the invention. As can be appreciated by the examples of FIGS. 4–7, the tips may be formed to have any of a wide variety of shapes and sizes. For example, as shown in FIG. 4, tips 16C and 16D may define substantially rectangular shapes. In that case, a bottom of valley 17C may be a flat surface parallel to a top surface of tips 16C and 16D. Alternatively, valley 17C may define a non-flat surface such as a concave or convex arc.

Figure 5:
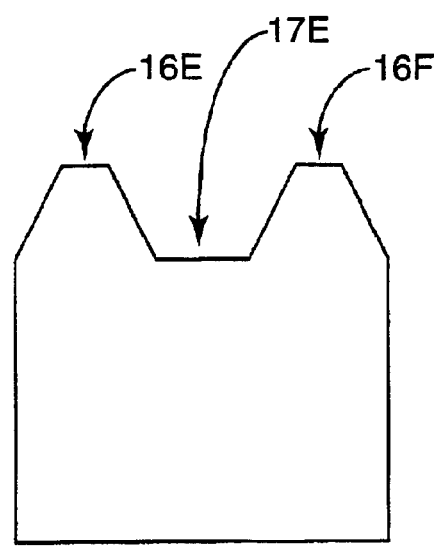

As shown in FIG. 5, tips 16E and 16F may define tapered shapes with flat tops. In that case, the side walls defined by tips 16E and 16F may taper such that tips 16E and 16F define pyramid-like shapes with flat tops. The bottom of valley 17E may also be a flat surface parallel to a top surface of tips 16E and 16F. Alternatively, the bottom of valley 17E or the tops of tips 16E and 16F may be non-flat.

Figure 6:
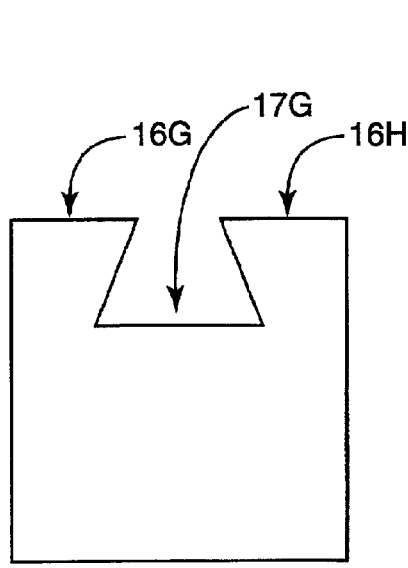

As shown in FIG. 6, tips 16G and 16H define undercut side walls. In other words, the bottom of valley 17G formed by neighboring tips 16G and 16H defines an acute angle relative to the side walls adjacent the bottom of valley 17G. These and other formations of tips 16 may be desirable for various applications.

Figure 7:
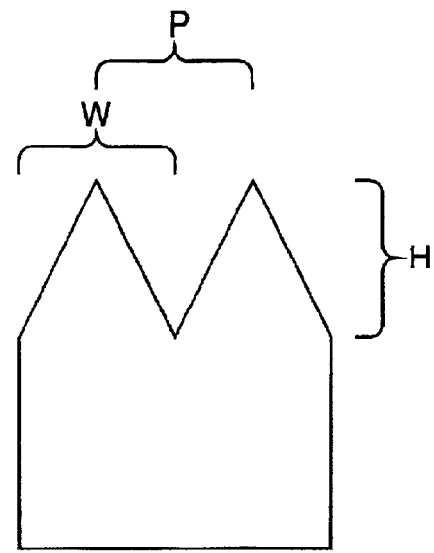

The tips 16 may also be subject to a wide variety of sizes. The sizes of the tips may be defined by one or more variables as illustrated in FIG. 7, including the height (H), the width (W), and the pitch (P). The height (H) refers the maximum distance from the bottom of the valley to the top of the tip. The width (W) may be defined as the average width, or as labeled in FIG. 7, the maximum width of a tip. The pitch (P) refers to the distance between adjacent tips. Another quantity that can be used to define the size of the tips is referred to as the aspect ratio. The aspect ratio is the ratio of height (H) to width (W). Experimental diamond tools created by focused ion beam milling processes have proven to achieve various heights, widths, pitches, and aspect ratios.

For example, the height (H) and/or the width (W) can be formed to be less than approximately 500 microns, less than approximately 200 microns, less than approximately 100 microns, less than approximately 50 microns, less than approximately 10 microns, less than approximately 1.0 micron, or less than approximately 0.1 micron. Additionally, the pitch may be defined to be less approximately 500 microns, less than approximately 200 microns, less than approximately 100 microns, less than approximately 50 microns, less than approximately 10 microns, less than approximately 1.0 micron, or less than approximately 0.1 micron. The aspect ratio may be defined to be greater than approximately 1:5, greater than approximately 1:2, greater than approximately 1:1, greater than approximately 2:1, or greater than approximately 5:1. Larger or smaller aspect ratios may also be achieved using focused ion beam milling. These different shapes and sizes may be advantageous for various applications.

Focused ion beam milling refers to a process in which ions such as gallium ions are accelerated toward the diamond in order to mill away atoms of the diamond (sometimes referred to as ablation). The acceleration of gallium ions may remove atoms from the diamond on an atom by atom basis. Vapor enhancing techniques using water vapors may also be used to improve the focused ion beam milling process. One suitable focused ion beam milling machine is the Micrion model 9500, commercially available from FEI Inc. of Portland Oreg. In accordance with the principles of the invention, it has been experimentally determined that focused ion beam milling processes can be used to create multi-tipped diamonds. In general, features to be created in a microreplication tool can be defined. Then, focused ion beam milling can be performed to create a diamond having multiple tips that correspond to the features to be created.

In order to create an ion beam milled diamond having multiple tips, one can define features to be created in a microreplication tool, and create a specification for a diamond, wherein the specification defines multiple tips that correspond to features to be created in a microreplication tool. The specification can then be used to perform focused ion beam milling to create a diamond according to the specification. One exemplary provider of focused ion milling services that may be used to create one or more ion beam milled diamonds is Materials Analytical Services of Raleigh, N.C.

Focused ion beam milling generally is very expensive. Therefore, to reduce the costs associated with the creation of a multi-tipped diamond, it is desirable to initially process the diamond to be ion beam milled prior to submitting the diamond to the focused ion beam milling process. For example, less expensive techniques such as lapping, grinding, or wire sawing techniques may be used to mill away significant portions of the diamond. The focused ion beam milling process may be needed to achieve one or more of the dimensions or features listed above. Still, by initially processing the diamond prior to focused ion beam milling, the amount of focused ion beam milling time required to create the final ion beam milled diamond can be reduced. Lapping refers to a process of removing material from the diamond using a loose abrasive, whereas grinding refers to a process in which material is removed from the diamond using an abrasive that is fixed in a medium or substrate.

Figure 8:
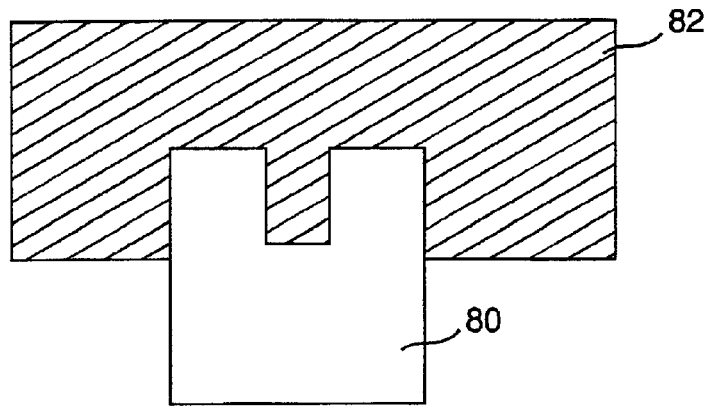
FIGS. 8–12 are various cross-sectional top views illustrating a two-tipped diamond cutting grooves into a work piece, and the resultant grooves and protrusions that can be formed in the work piece.
Figure 9:
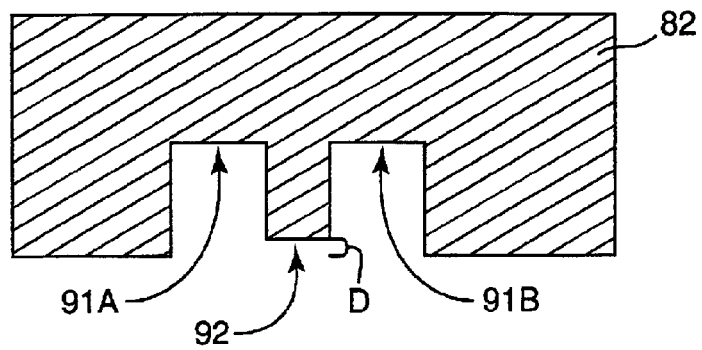

FIG. 8 is a cross-sectional top view illustrating a two-tipped diamond 80 cutting grooves into a work piece 82. FIG. 9 is another cross-sectional top view of work piece 82, illustrating the grooves 91A and 91B as well as protrusion 92 that results from the cut illustrated in FIG. 8. As can be appreciated by FIGS. 8 and 9, protrusion 92 is defined by the valley formed between neighboring tips of diamond 80. For this reason, protrusion 92 may be a distance (D) from an outer surface of work piece 82. In other words, an amount of material corresponding to distance D is removed from work piece to define the top of protrusion 92. This may result in more uniformity between protrusions formed on work piece 82 relative to protrusions created using a single tipped diamond. In addition, clean-up of protrusion 92 may be reduced or avoided.

Grooves 91A and 91B also have substantially the same depth relative to one another. In contrast, when a single tipped diamond is used to create grooves a microreplication tool, depth variations between adjacent grooves may be formed. By using a multi-tipped diamond to simultaneously cut grooves, clean-up associated with depth variations between adjacent grooves may also be reduced or avoided.

Figure 10:
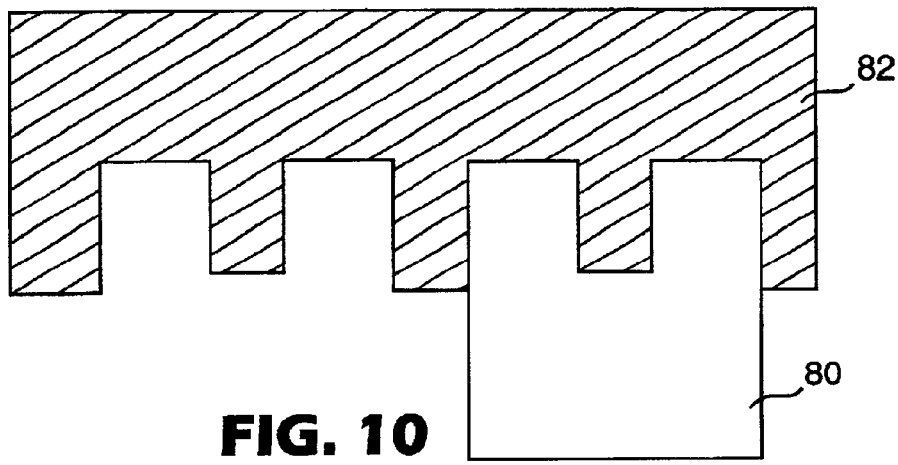
Figure 11:
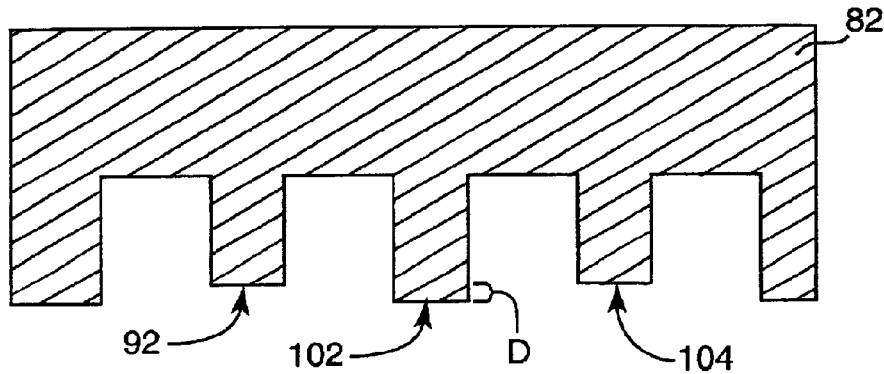

FIGS. 10 and 11 are additional cross-sectional top views illustrating the two-tipped diamond 80 cutting subsequent grooves into work piece 82 (FIG. 10) and the subsequent grooves and protrusions that results from the cut (FIG. 11).

In other words, the cut illustrated in FIG. 10 may be subsequent to the cut illustrated in FIG. 8. As shown in FIG. 11, clean-up associated with protrusion 102 may be necessary to an extent of distance D. However, clean-up on the other protrusions 92 and 104 may be reduced or avoided. Also, because the protrusions 92 and 104 are similarly defined by work piece 82, the amount of clean-up required on protrusion 102 can be more easily quantified by distance D, which corresponds to the same amount of material removed from the top of protrusions 92 and 104 during the respective cuts by diamond 80. In short, by using a multi-tipped diamond, more precise features can be created in work piece 82 and the required amount of clean-up may be reduced.

Figure 12:
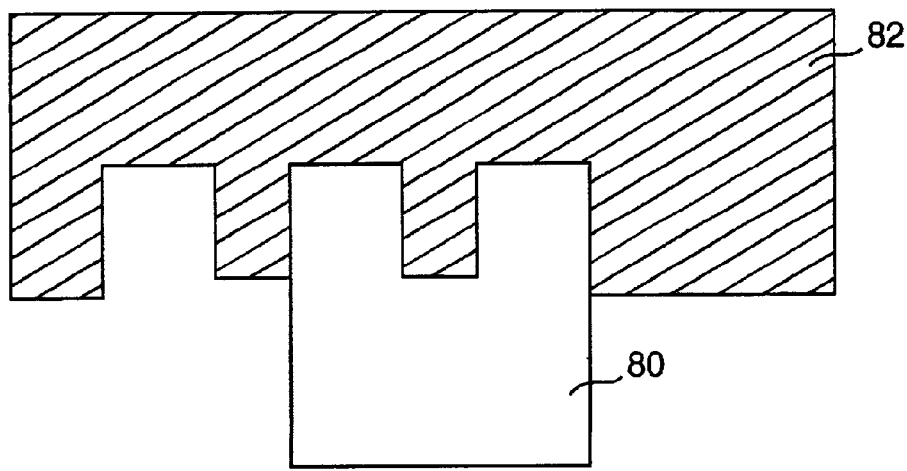

FIG. 12 illustrates an alternative to the cutting technique illustrated in FIG. 10. FIG. 12 is a cross-sectional top view illustrating the two-tipped diamond 80 making a subsequent cut to that illustrated in FIG. 8. In FIG. 12, however, the subsequent cut overlaps with the previous cut. In other words, the left most tip of diamond 80 follows groove 92 (FIG. 9), and the right most tip of diamond 80 cuts another groove. Such a cutting technique may result in more precise similarities between created features in the work piece, and clean-up may be reduced or avoided. In some cases, a large number of tips may be formed on a diamond, but only one tip may overlap during subsequent cutting passes. The overlapping tip may be used to precisely position the diamond relative to the work piece such that the features cut into the work piece have substantial similarity in terms of heights and depths.

Figure 13:
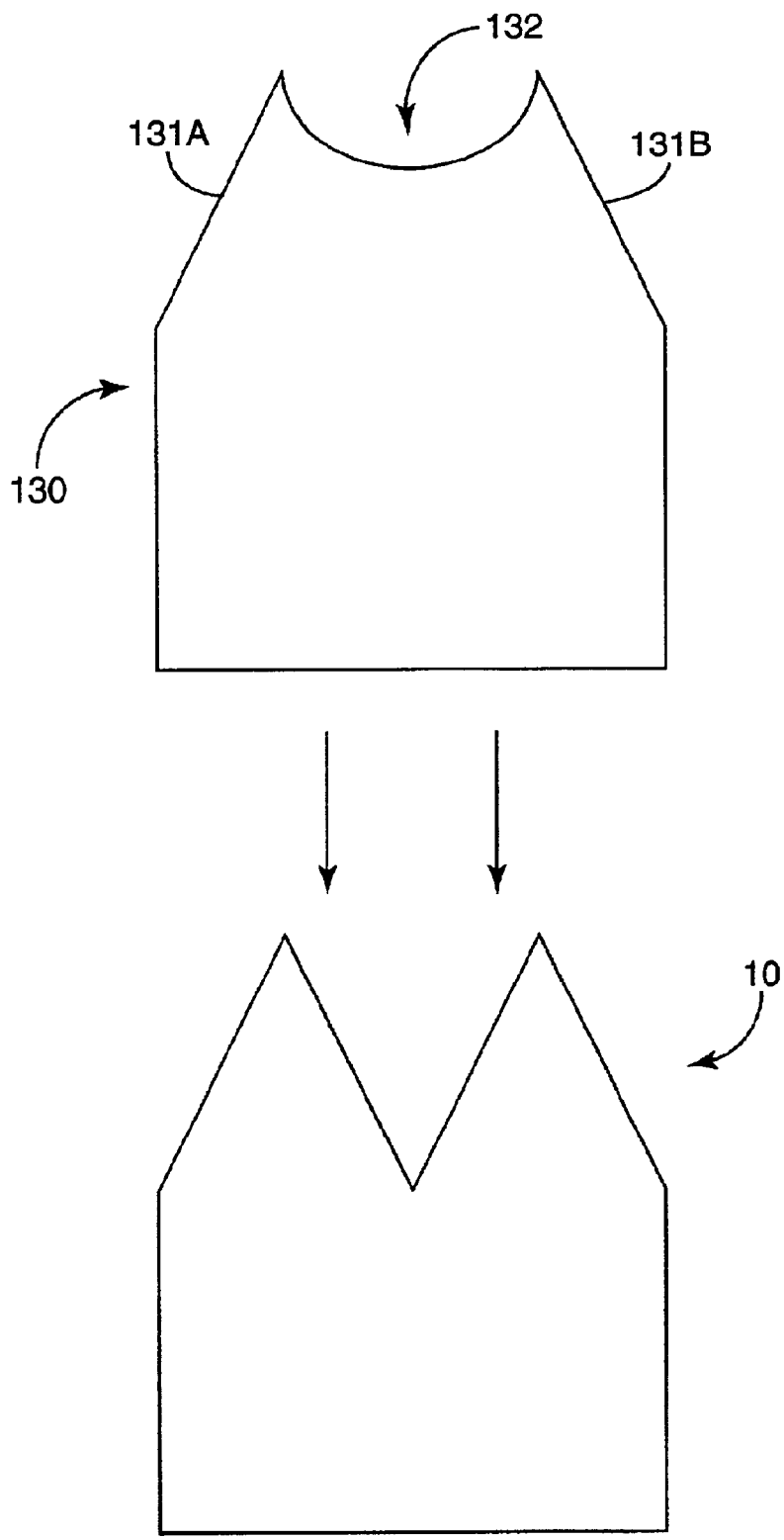
FIG. 13 illustrates a technique that may be used to simplify the creation of a two-tipped diamond.

FIG. 13 illustrates one technique that may be used to simplify the creation of a two-tipped diamond. Diamond 130 may be initially processed by lapping edges 131A and 131B. Also, a wire saw can be used to create an initial valley 132. These simple processing steps can significantly reduce the amount of focused ion beam milling time required to create the final ion beam milled diamond. Once processed, diamond 130 can be sent to an focused ion beam milling process (as conceptually represented by the arrows of FIG. 13). The focused ion beam milling process can be used to accelerate gallium ions at diamond 130 in order to mill away diamond atoms to ultimately define the multi-tipped ion beam milled diamond 10.

Figure 14:
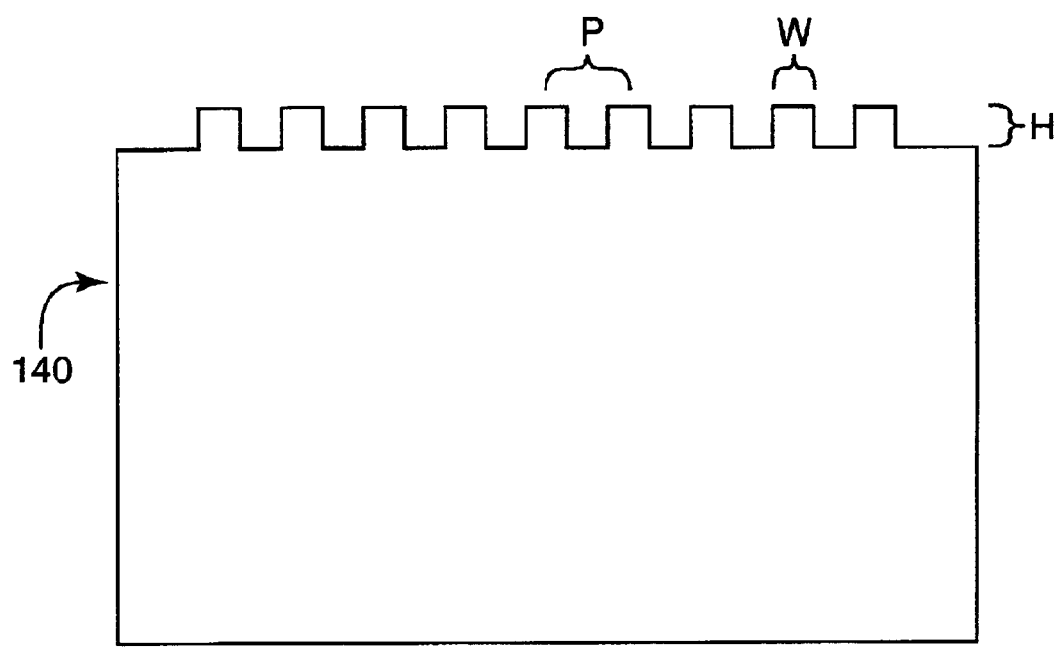
FIG. 14 is a top view of a multi-tipped ion beam milled diamond according to another embodiment.

As outlined above, a multi-tipped diamond may include any number of tips, and the tips may assume a wide variety of shapes and sizes. FIG. 14 is a top view illustrating a multi-tipped diamond. In the example of FIG. 14, multi-tipped diamond 140 defines nine separate tips. The tips of a diamond like that illustrated in FIG. 14 may define widths (W) of approximately 0.1 micron, pitches (P) of approximately 0.2 micron, heights (H) of approximately 0.2 micron and an aspect ration (H:W) of approximately 2:1. Similar to the illustration of FIG. 2, diamond 140 may extend a distance in a thickness direction, and the valleys of diamond may also extend a distance in the thickness direction.

Figure 15:
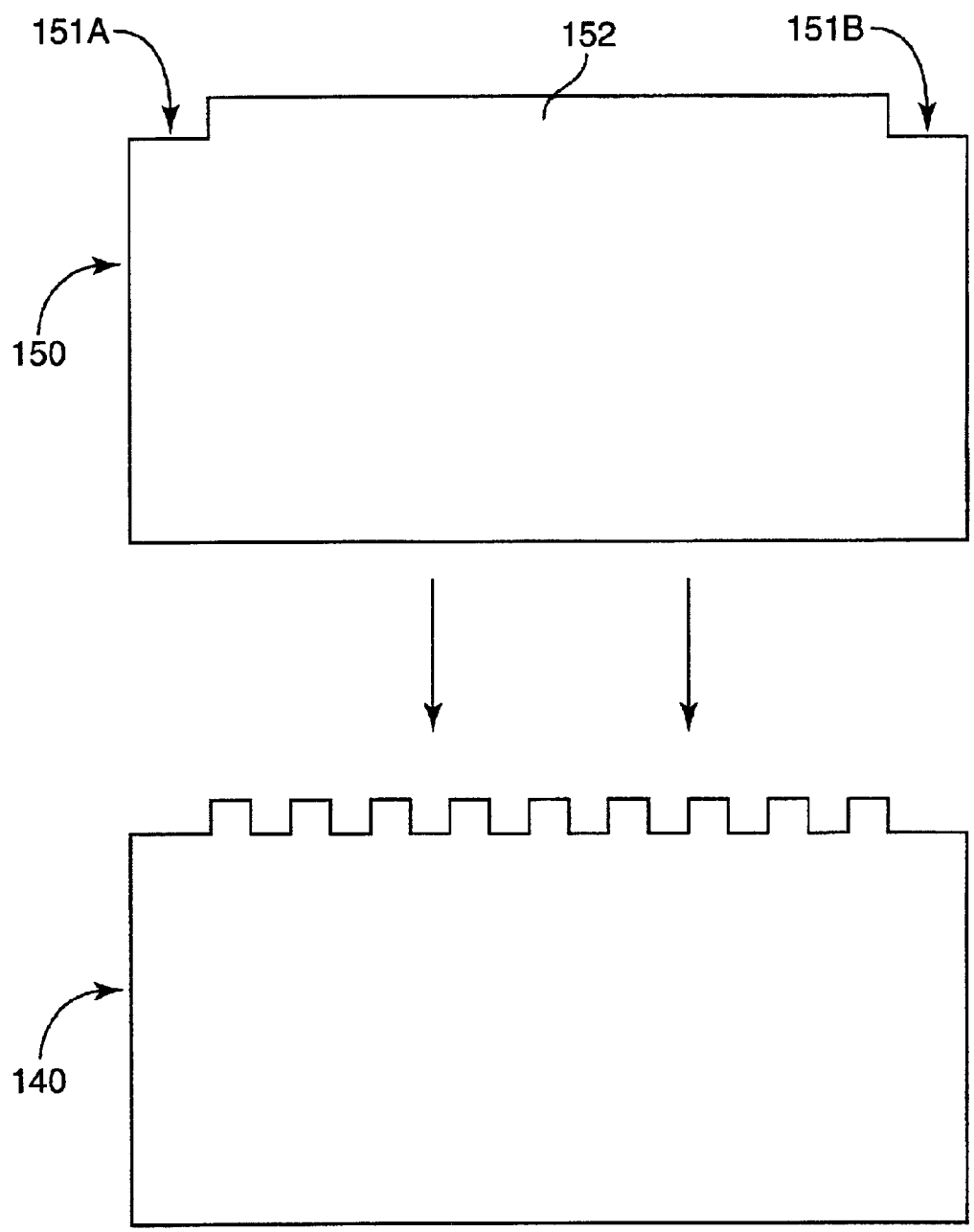
FIG. 15 illustrates a technique that may be used to simplify the creation of a multi-tipped diamond like that illustrated in FIG. 14.

FIG. 15 illustrates a technique that may be used to simplify the creation of a multi-tipped diamond like that illustrated in FIG. 14. In that case, diamond 150 may be initially processed by lapping or grinding sides 151A and 151B in order to define one relatively wide protrusion 152. Once processed, diamond 150 can be sent to an focused ion beam milling process (as conceptually represented by the arrows of FIG. 15). The focused ion beam milling process can then be applied to accelerate gallium ions at diamond 150 in order to mill away diamond atoms to ultimately define the multi-tipped ion beam milled diamond 140 according to specification.

Figure 16:
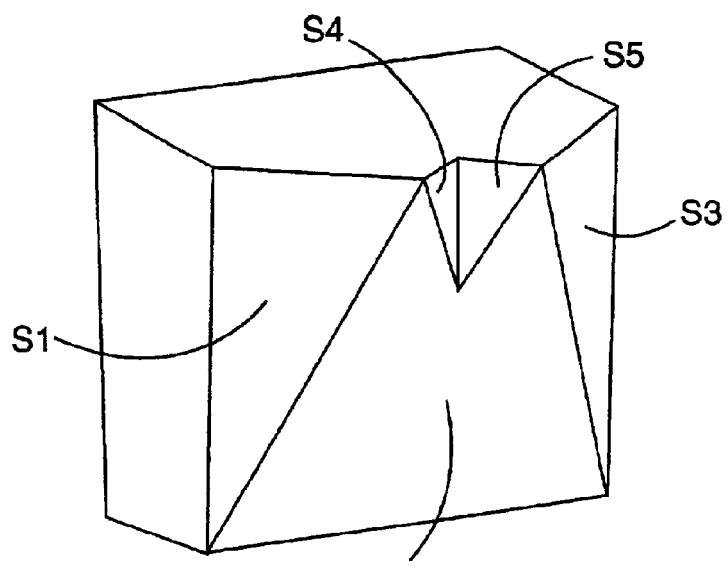
FIG. 16 is a perspective view of a two-tipped ion beam milled diamond similar to FIG. 2B.

FIG. 16 is a perspective view of a two-tipped ion beam milled diamond similar to FIG. 2B. As shown in FIG. 16, diamond 12 may define five specifically defined surfaces (S1–S5). Surfaces S1, S2 and S3 may be created by grinding or lapping techniques, and surfaces S4 and S5 may be created by focused ion beam milling techniques.

Figure 17:
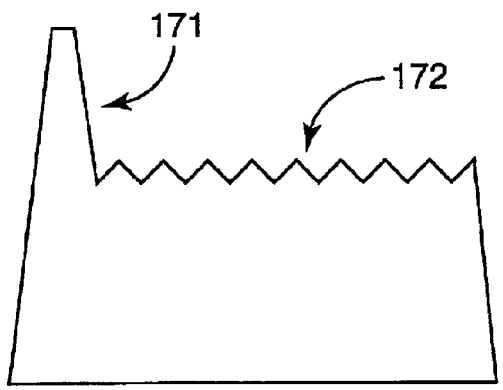
FIGS. 17–24 are additional cross-sectional top views illustrating various multi-tipped ion beam milled diamonds according to various embodiments of the invention.

FIGS. 17–24 are additional cross-sectional top views illustrating various multi-tipped ion beam milled diamonds according to various embodiments of the invention. As shown in FIG. 17, a diamond may include tips of different shapes and sizes. For example, tip 171 may be used to create one type of feature in a work piece, and tips 172 may be used to create another type of feature in a work piece. By way of example, a height of tip 171 may be more than approximately 5-times larger than the height of tips 172, more than approximately 10-times larger, or more than approximately 20-times larger.

Figure 18:
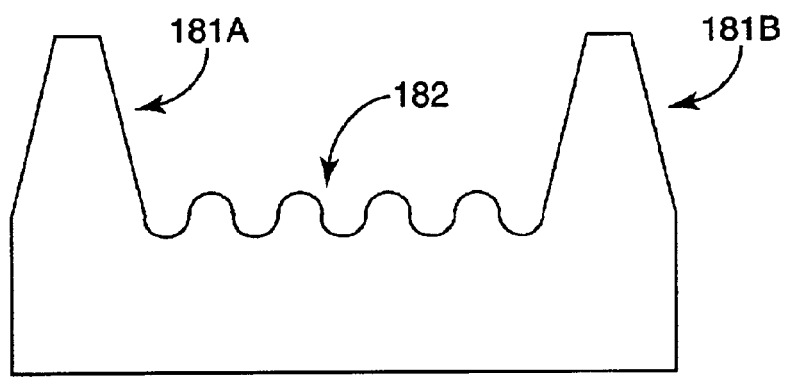
Figure 19:
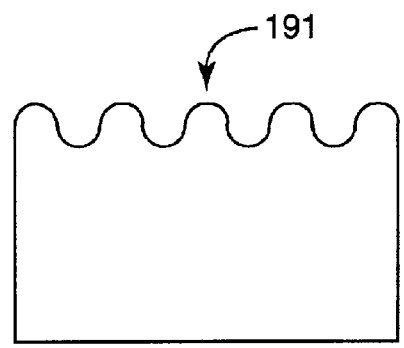
Figure 20:
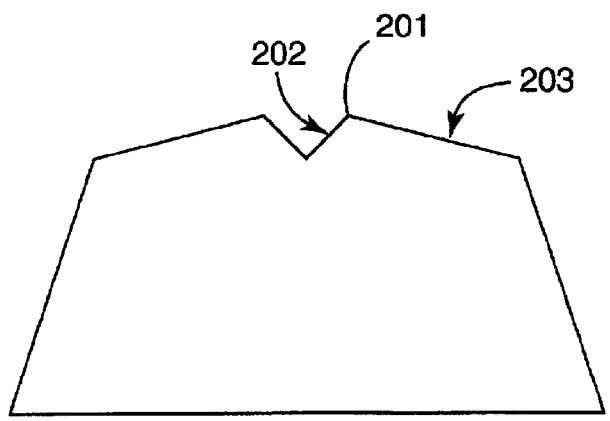

As shown in FIG. 18, a diamond may include multiple relatively large tips 181A and 181B, separated by relatively small tips 182. In this example, tips 182 define a periodic sinusoidal function. Similarly, as shown in FIG. 19, tips 191 ay define a periodic sinusoidal function. Any other mathematical function, random or pseudo-random surface may also be formed. FIG. 20 shows a slight variation of a two-tipped diamond in which an outer surface 203 of tip 201 defines an angle that is different than that of an inner surface 202.

Figure 21:
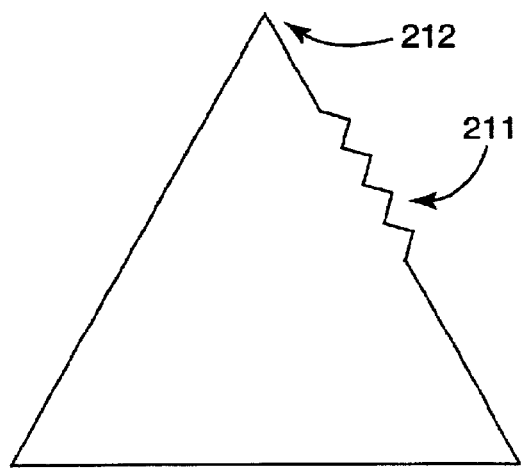
Figure 22:
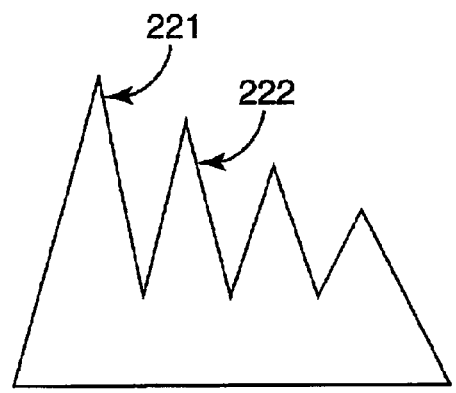

FIG. 21 illustrates a diamond in which tips 211 are formed on a side of tip 212. FIG. 22 illustrates a diamond in which tips 221 and 222 define variable different heights. Variable valleys, variable inner surface wall angles, and/or variable pitch spacing between adjacent tips may also be defined.

Figure 23:
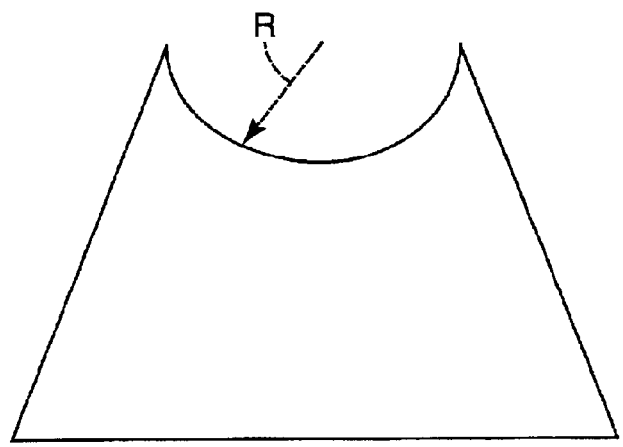
Figure 24:
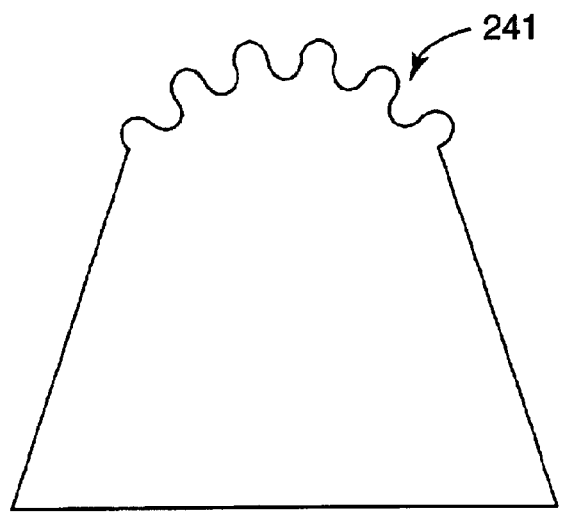

FIG. 23 illustrates a diamond in which tips define a valley having a convex radius (R). FIG. 24 illustrates a diamond in which multiple periodic sinusoidal like tips follow an arc-shaped surface of the diamond. These and many other variations of the invention are within the scope of the claims.

A number of embodiments have been described. For example, multi-tipped ion beam milled diamonds have been described for use in diamond tooling machines. Nevertheless, various modifications can be made to the embodiments described above without departing from the scope of the following claims. For example, the multi-tipped diamond may be used to cut grooves or other features into other types of work pieces, e.g., work pieces other than microreplication tools. Accordingly, other implementations and embodiments are within the scope of the following claims.

What is claimed is:

1. A method comprising:

defining features to be created in a microreplication tool;

creating a specification for a diamond, wherein the specification defines multiple tips that correspond to the features to be created in the microreplication tool;

focused ion beam milling the diamond to have multiple tips according to the specification; and creating the microreplication tool using the ion beam milled diamond, wherein creating the microreplication tool comprises cutting a number of grooves in the tool with a number of passes of the ion beam milled diamond, wherein the number of grooves is greater than the number of passes.

2. The method of claim 1, further comprising:

processing the diamond prior to focused ion beam milling the diamond to reduce the amount of focused ion beam milling required to form the multiple tips according to the specification.

3. The method of claim 1, wherein the multiple tips include two tips.

4. The method of claim 3, wherein a valley between the two tips defines a bottom surface selected from the following group: a convex arc shaped surface, a concave arc shaped surface, and a flat surface.

5. The method of claim 1, wherein a pitch spacing between two neighboring tips is less than approximately 500 microns.

6. The method of claim 5, wherein the pitch spacing is less than approximately 200 microns.

7. The method of claim 6, wherein the pitch spacing is less than approximately 100 microns.

8. The method of claim 7, wherein the pitch spacing is less than approximately 10 microns.

9. The method of claim 8, wherein the pitch spacing is less than approximately 1 micron.

10. The method of claim 9, wherein the pitch spacing is less than approximately 0.1 micron.

11. The method of claim 1, wherein an aspect ratio of a height of a respective tip relative to a width of the respective tip is greater than approximately 1 to 1.

12. The method of claim 1, wherein an aspect ratio of a height of a respective tip relative to a width of the respective tip is greater than approximately 2 to 1.

13. The method of claim 1, wherein the multiple tips define a width of less than approximately 200 microns.

14. The method of claim 1, wherein the multiple tips each define substantially straight side walls and wherein a bottom of a valley formed by neighboring tips approximately defines a right angle relative to the side walls.

15. The method of claim 1, wherein the multiple tips each define undercut side walls and wherein a bottom of a valley formed by neighboring tips defines an acute angle relative to the undercut side walls.

16. The method of claim 1, wherein the multiple tips each define side walls and wherein a bottom of a valley formed by neighboring tips defines an obtuse angle relative to side walls.

* * * * *

UNITED STATES PATENT AND TRADEMARK OFFICE
CERTIFICATE OF CORRECTION

PATENT NO. : 7,140,812 B2
APPLICATION NO. : 10/159925
DATED : November 28, 2006
INVENTOR(S) : William J. Bryan Page 1 of 1

It is certified that error appears in the above-identified patent and that said Letters Patent is hereby corrected as shown below:

*Page 2,
Item [56], References Cited, OTHER PUBLICATIONS,
Line 10, delete "Curvlinear" and insert -- Curvilinear -- therefor.

Column 7,
Line 38, delete "an" and insert -- a --, therefor.
Line 52, delete "ration" and insert -- ratio --, therefor.
Line 61, delete "an" and insert -- a -- therefor.

Column 8,
Line 22, delete "ay" and insert -- may -- therefor.

Signed and Sealed this

Tenth Day of April, 2007

JON W. DUDAS
*Director of the United States Patent and Trademark Office*